(12) United States Patent
Pool

(10) Patent No.: US 6,247,554 B1
(45) Date of Patent: Jun. 19, 2001

(54) BEARING LUBRICATION APPARATUS

(75) Inventor: James L. Pool, Clarinda, IA (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 09/209,944

(22) Filed: Dec. 11, 1998

(51) Int. Cl.$^7$ ................................................ F16C 1/24
(52) U.S. Cl. ........................................................ 184/5.1
(58) Field of Search .......................... 384/398; 184/5.1, 184/105.1

(56) References Cited

U.S. PATENT DOCUMENTS

| | | | |
|---|---|---|---|
| 1,991,542 | * | 2/1935 | Cavanaugh .............................. 184/5.1 |
| 2,210,478 | * | 8/1940 | Berg ....................................... 184/5.1 |
| 2,439,888 | * | 4/1948 | Ginter .................................... 184/5.1 |

* cited by examiner

Primary Examiner—David A. Bucci
Assistant Examiner—Colby Hansen
(74) Attorney, Agent, or Firm—Banner & Witcoff, Ltd.

(57) ABSTRACT

A bearing and circular raceway lubrication apparatus includes congruent and nesting male and female, polymeric material plates wherein the male plate includes a counterbore opening for receipt of a rod with a hollow shaft through which lubricant is directed into the region between nested plates when a bearing raceway is compressed between the plates. The female plate includes an integrally molded hub with a threaded throughbore for receipt of the hollow shaft.

1 Claim, 4 Drawing Sheets

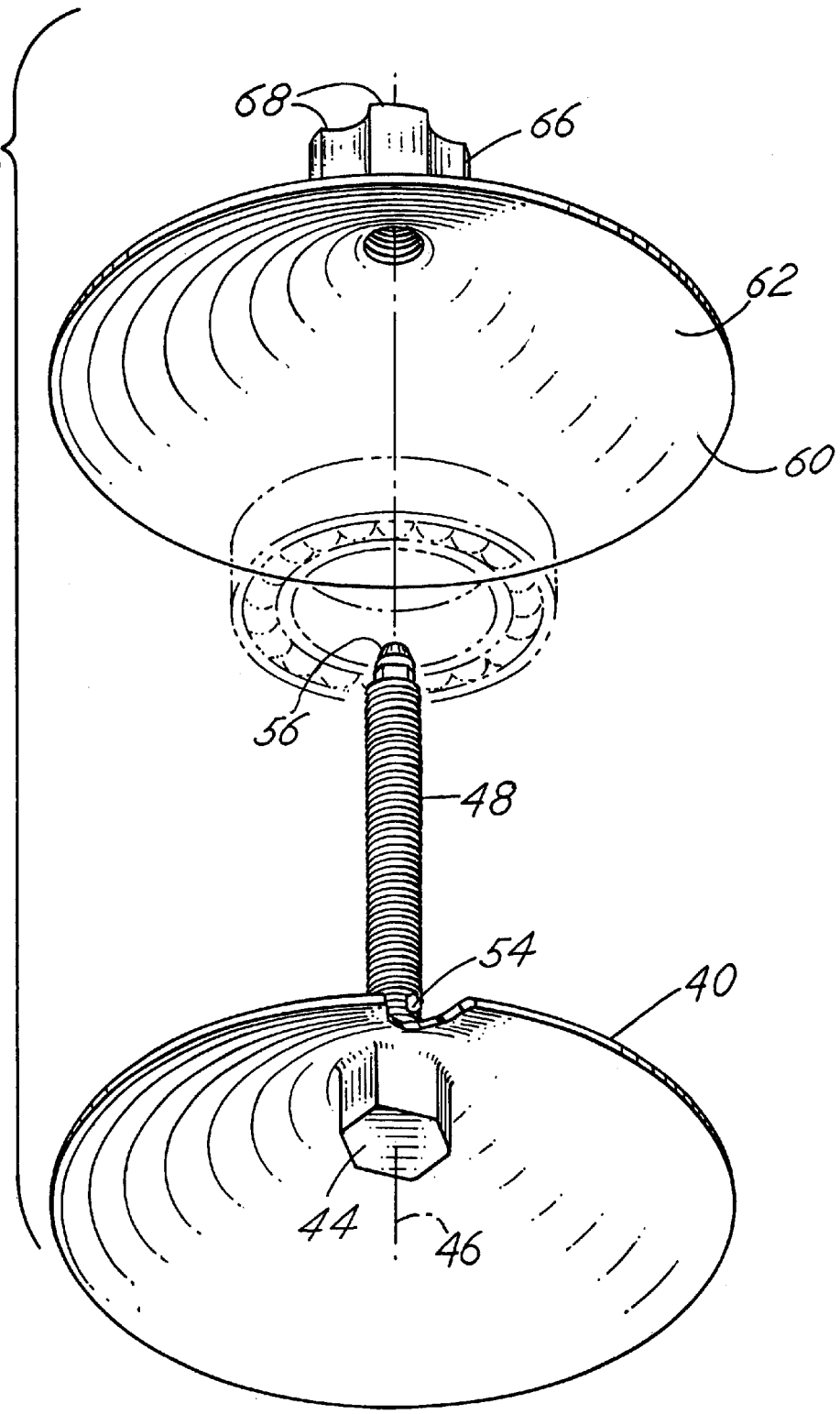

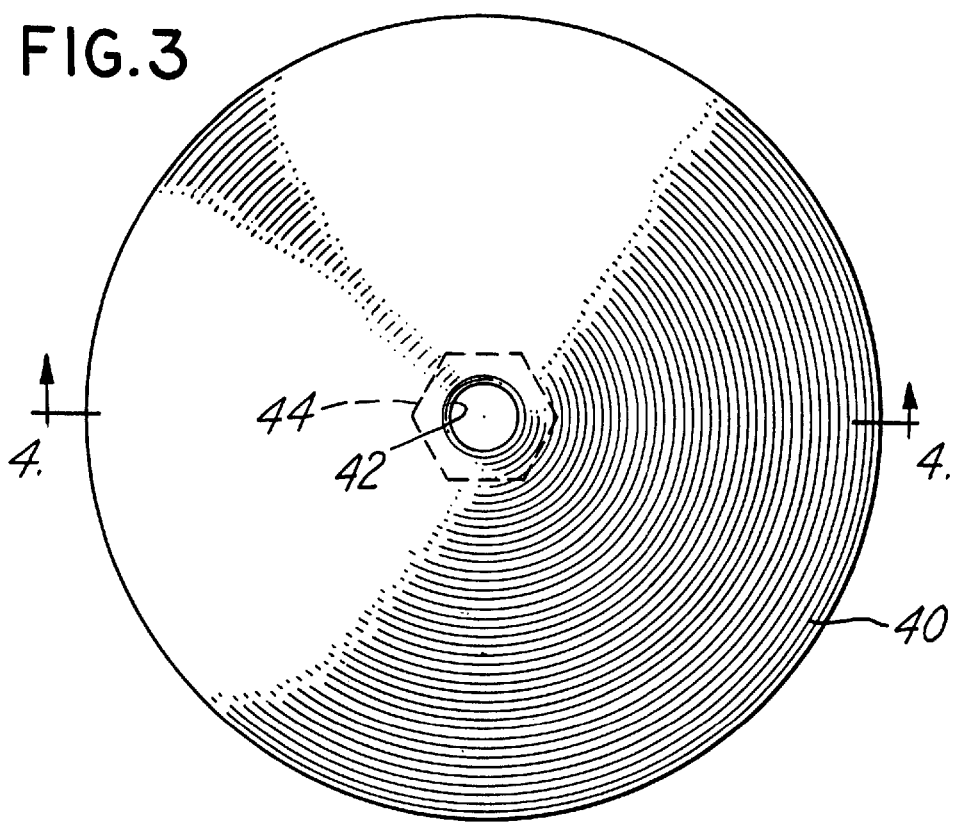
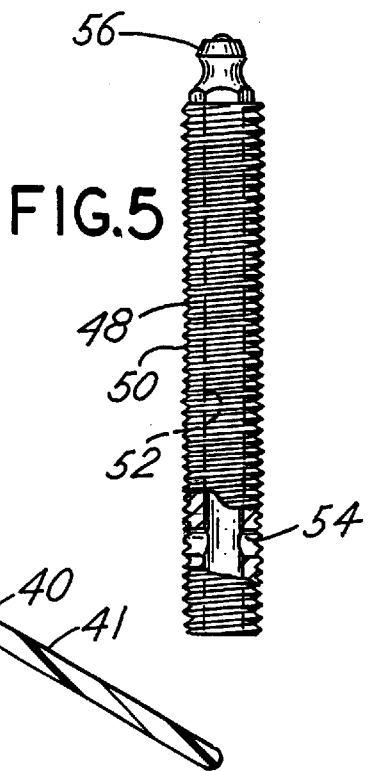

BEARING LUBRICATION APPARATUS

BACKGROUND OF THE INVENTION

The present invention relates to an apparatus which is used to encapsulate and lubricate bearings, for example, ball bearings mounted in a bearing raceway.

Mechanics and other repairmen who have the responsibility for maintaining vehicles and other apparatus of the type having a shaft or axle mounted with bearings, often find it necessary to lubricate the bearings. Lubrication is typically effected by removal and cleaning the raceway containing the bearings and/or injecting or otherwise forcing a lubricating material into the raceway and around the bearings. Applicant's assignee has in the past manufactured and sold apparatus to effect such lubrication.

Prior art apparatus is comprised of first, second congruent, molded polymeric, conically shaped plates which are nested or overlie one another. The first plate includes a threaded aluminum rod or shaft extending from the apex of the plate. The rod is threadable into an aluminum fitting which is attached to the apex of the second plate. In use, a raceway with bearings is positioned between the plates, and the plates are rotated with respect to each other to narrow the space between the plates and thereby encapsulate the raceway. The aluminum shaft projected from the first plate contains a hollow passageway which is connected to the region or space between the plates where the encapsulated raceway is located. Lubricating material is injected through that passageway into the region between the plates and envelopes the raceway and bearings forcing old lubricating material and dirt from and encapsulating the raceway with new lubricating material. Any excess lubricating material is ejected outwardly between the peripheral edges of the plates.

The described apparatus works well. However, the cost of manufacture is significant. Moreover, the mechanism for attaching the aluminum shaft to the one plate and for attaching the threaded aluminum hub to the other plate is not fail safe. For example, the polymeric parts may separate from the aluminum parts, thereby rendering the apparatus ineffective. Thus there is a recognized need for an improved assembly and construction of such apparatus.

SUMMARY OF THE INVENTION

In a principal aspect, the present invention comprises a set of male and female conical plates which are substantially the same size and shape. The male plate includes a central counterbore integrally molded therewith at the apex or centerline of the plate. The counterbore is adapted to receive a threaded hollow shaft or rod with a valve fitting at the outer or distal end of the shaft. The shaft is threaded into the counterbore. The female plate includes an integrally molded hub with an internally threaded throughbore adapted to receive the aluminum rod or shaft projecting from the male plate. The hub includes external flutes or ribs in a pattern that facilitate manual manipulation of the female plate by rotation to appropriately encapsulate and compress a bearing assembly or raceway between the plates.

Thus it is an object of the invention to provide an improved apparatus for effecting lubrication of a wheel bearing assembly of the type which includes bearings in a cage or raceway.

A further object of the invention is to provide an improved apparatus for lubrication of a wheel bearing assembly wherein the apparatus is comprised of fewer parts, is easily assembled wherein the parts comprising the apparatus are fabricated in a manner which ensures the reliability of the apparatus and wherein the apparatus is less expensive to manufacture and assemble.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 2 is an exploded, isometric view of the bearing lubrication apparatus of the invention;

FIG. 3 is a plan view of the male plate associated with the apparatus of the invention;

FIG. 4 is a cross sectional view of the plate of FIG. 3 taken along the line 4—4;

FIG. 5 is an elevation or plan view of the shaft associated with the male plate of FIGS. 3 and 4;

DESCRIPTION OF THE PREFERRED EMBODIMENT

Figure 1:
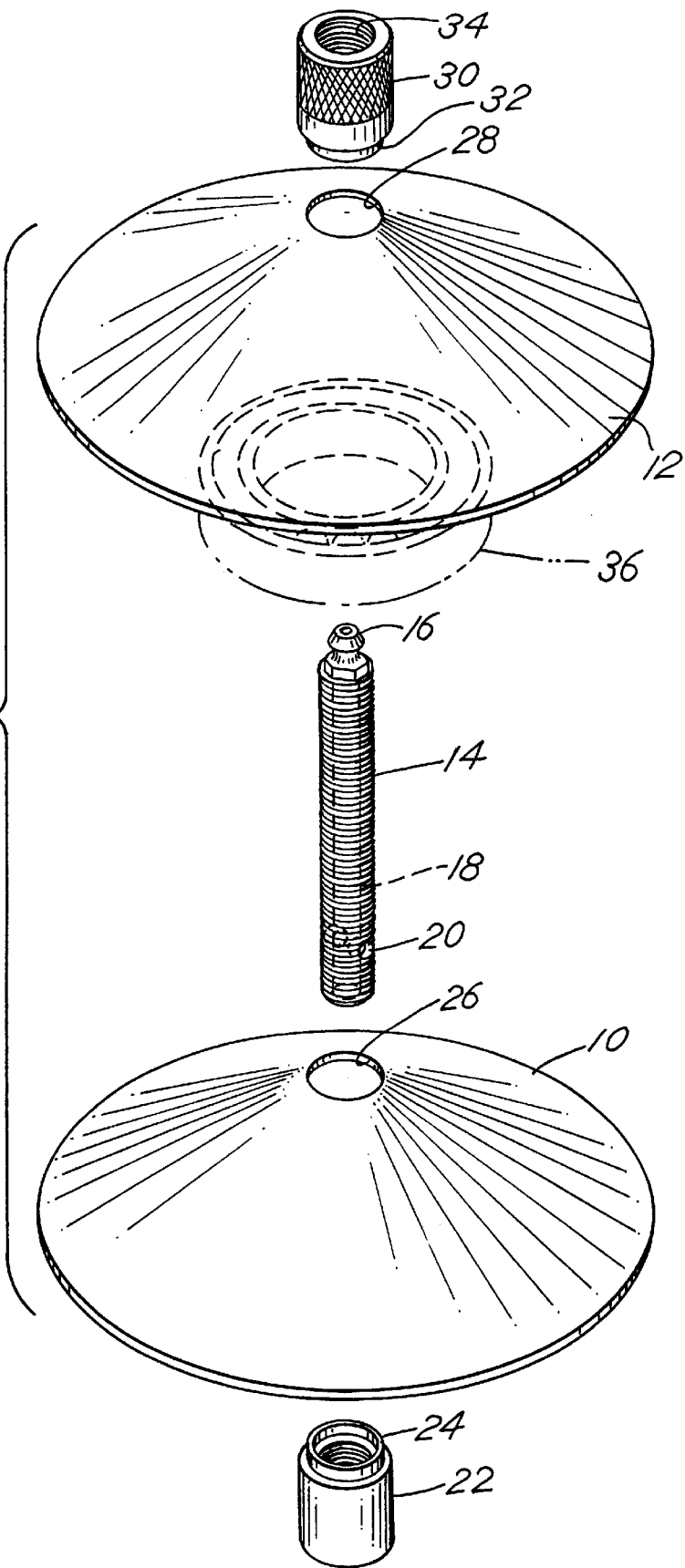
FIG. 1 is an exploded, isometric view of a typical prior art bearing lubrication apparatus.
Figure 6:
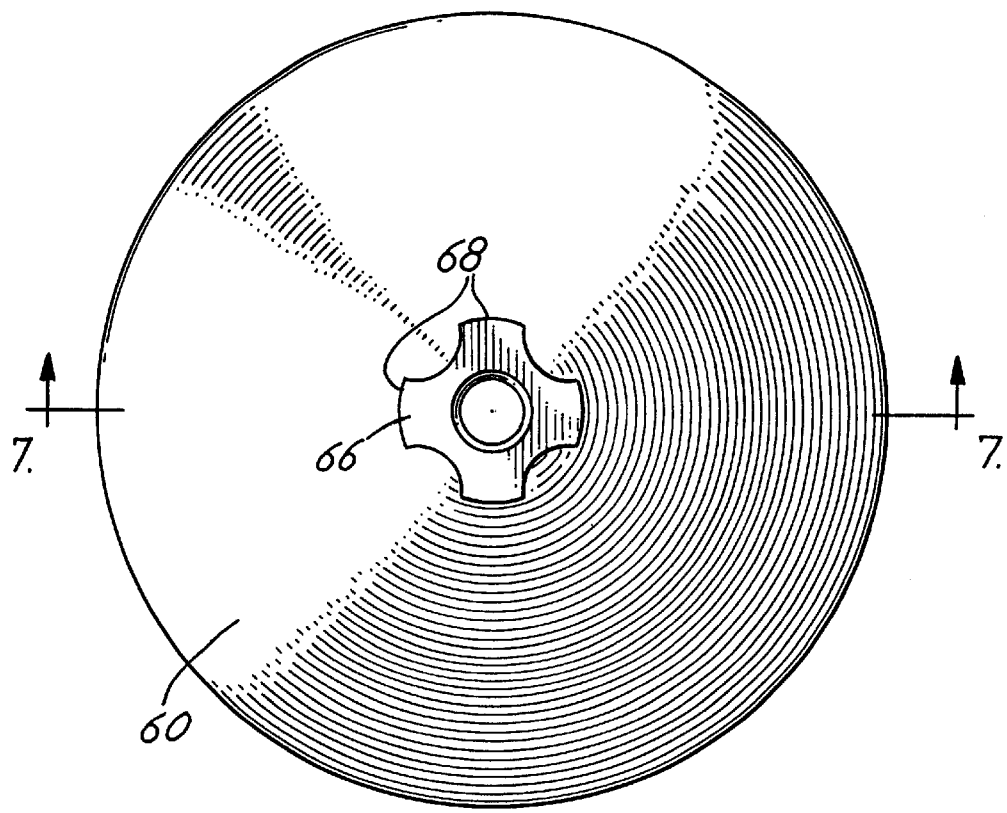
FIG. 6 is a top plan view of the female plate.
Figure 7:
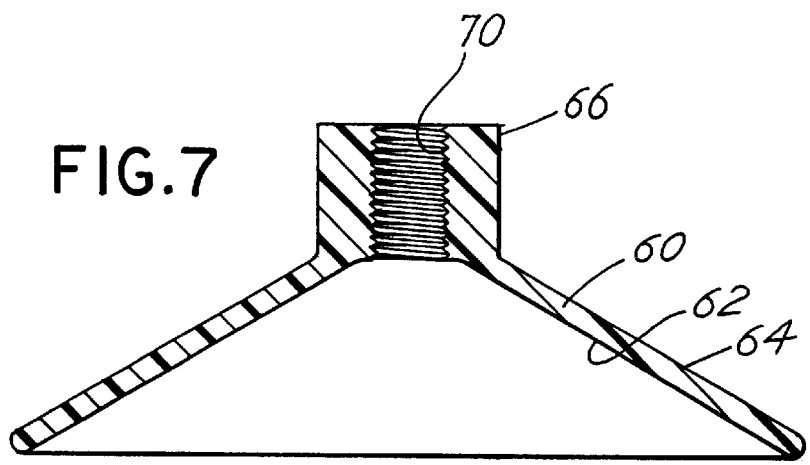
FIG. 7 is a cross sectional view taken along line 7—7 of FIG. 6 of the female plate.

FIG. 1 depicts a known prior art construction for apparatus to lubricate bearings in a bearing assembly or raceway. The prior art apparatus includes five separate parts, two of which are molded plastic parts. The three remaining parts are machined, typically, from aluminum. Thus, the prior art device includes a first, molded plastic, male plate 10 and a second, molded plastic, female plate 12. The plates 10 and 12 are conical and substantially identical in configuration. A hollow shaft or rod 14 with a grease valve fitting 16 at one end and an axial throughbore 18 connected to a transverse outlet or passage 20 is attached to the first, male plate 10. Cooperative with the shaft or rod 14 is a cap 22. Cap 22 includes a rim 24 that is crimped to the side of a passage 26 which extends axially from the apex of the frustoconical plate 10. The rod or shaft 14 is then threadably inserted into the cap 22 so that the combination of plate 10, rod 14 and cap 22 comprise the male component of the lubrication device.

The female or second frustoconical plate 12 includes a through passage 28 into which a machined aluminum fitting 30 is inserted and is attached thereto by crimping of an annular rim or rib 32 of the fitting 30 over the edge of passage 28. The fitting 30 is knurled on its outside surface and has a threaded interior throughbore 34 for threadable receipt of the rod 14.

In operation, a bearing raceway, such as a circular bearing race 36, is positioned over rod 14 on plate 10. The second plate 12, and more particularly the collar 30, is then threaded onto the rod 14 and the plate 12 is tightened against the bearing race 36. The transverse passage 20 exits in the space between the plates 10 and 12. A grease gun or other source of lubrication is attached to the fitting 16 and lubricating material is forced through the throughbore 18 and the passageway 20 into the region between the plates 10 and 12. The lubricating material then forces itself outwardly, radially from the center of the shaft of rod 14 and effects removal of prior lubricating materials from the race 36. Lubricating material then fills the spaces within the race. The plates 10 and 12 may then be separated so that the race can be used in a vehicle or the like.

The remaining figures illustrate the improved construction of the present invention wherein a number of component parts have been eliminated, and further, the price, efficiency, cost of construction or manufacture and reliability are all improved relative to the prior art construction. Specifically, a frustoconical, molded plastic, first, male plate 40 includes an integrally molded counterbore passage 42 molded in a central axial depending projection 44 centered on an axis 46. Bore or passage 42 is threaded to receive a threaded rod or shaft 48. The rod or shaft 48 has outer threads 50 and an internal axial through passage 52 connected to a transverse discharge passage 54. The rod 48 is threadably inserted into the counterbore 42 and tightly retained therein by the interaction of the threads of the rod 48, which is typically a metal rod, for example aluminum, and the molded material comprising the plate 40. Plate 40 is typically made from a Delrin material. A characteristic of the threaded interaction between the aluminum threads 50 and the threads of the counterbore 42 is tight retention of the rod 48.

The device further includes a grease valve fitting 56 attached to the the free outer end of the rod 48. Valve fitting 56 is compatible with a grease gun or other source of lubrication which may be fitted onto the valve 56 to provide lubricating material through the passage 52 and passage 54.

As a separate component, the combination includes a second, female, frustoconical molded polymeric or plastic material plate 60. The plate 60, like the plate 40, includes an inner conical surface 62 and an outer surface 64. The inner surface 62 is engageable or opposed to outer conical surface 41 of plate 40. The circumference and cross sectional dimensions of the plates 40 and 60 are substantially the same so that the plates 40, 60 are generally compatible and congruent.

The second plate 60 further includes an axial hub 66 which is integrally molded with the plate 60 and which extends or projects outwardly in the direction of the centerline of the apex of the frustoconical member or plate 60. The hub 66 includes a series of at least four parallel, axial flutes 68 equally spaced about the periphery of the hub. The flutes facilitate gripping and rotation of the plate 60 on the shaft 48. The hub 66 is internally threaded with an internal through passage 70 into which the rod or shaft 48 is threadable received. Thus the plates 60 and 40 may be rotated relative to one another to compress an item (bearing raceway) retained therebetween.

With the improved bearing lubrication apparatus of the invention, fewer component parts are utilized thus reducing the cost of assembly and further reducing the number of machining and other similar operations that must be performed in the manufacture of the product. Further the product is deemed to be more rugged or rigid since it is unitary. Other variations of the construction may be possible. Thus the invention is to be limited only by the following claim and equivalents thereof.

What is claimed is:

1. Apparatus for lubrication of bearings comprising in combination:

a first molded polymeric, conical plate defining a convex male bearing support surface having an apex with a molded, centerline axis, threaded counterbore opening;

a threaded hollow axial passage metal rod threadably inserted into the first plate threaded counterbore opening, tightly engaged into the counterbore opening and projecting axially from the apex, said rod including a transverse discharge passage from the hollow axial passage;

a second molded, polymeric plate defining a concave female support surface generally congruent with the first plate, said second plate including an integrally molded, centerline apex hub projecting outwardly from the second plate along the axis, said hub having a threaded throughbore sized to threadably engage the threaded rod, said second plate comprising a concave female surface opposed to the convex male surface of the first plate when the apex hub is threaded onto the rod, said hub including at least four parallel, axial flutes integrally molded therein and equally spaced on the periphery of the hub; and a valve member at the distal end of the metal rod connected to the hollow passage for directing lubrication material to the passage, and the transverse discharge passage to the region intermediate the space between the convex male and concave female surfaces of the plates.

* * * * *